United States Patent [19]

Nelson et al.

[11] 4,452,556
[45] Jun. 5, 1984

[54] PLASTIC HEADED FASTENER

[76] Inventors: John F. Nelson, 911 Herr Dr., New Lenox, Ill. 60451; Ernest H. Lindsay, Jr., 11604 S. Brightway, Mokena, Ill. 60448; Albert M. Zeller, 21822 S. Merrill Ave., Sauk Village, Ill. 60411; Francis C. Peterson, 1426 Seventh Ct., St. Charles, Ill. 60174

[21] Appl. No.: 194,510

[22] Filed: Oct. 6, 1980

[51] Int. Cl.³ .................... F16B 23/00; F16B 35/06
[52] U.S. Cl. ................................ 411/377; 411/403; 411/903
[58] Field of Search ............ 411/377, 373, 429, 903, 411/902, 403, 404, 402

[56] References Cited

U.S. PATENT DOCUMENTS

| | | | |
|---|---|---|---|
| 281,564 | 7/1883 | Sanders | 411/402 |
| 3,134,290 | 5/1964 | Jentoft | 411/377 |
| 3,168,321 | 2/1965 | Glicksman | 411/531 X |
| 3,557,654 | 1/1971 | Weidner, Jr. | 411/378 |
| 3,618,444 | 11/1971 | Kay et al. | 411/373 |
| 3,693,495 | 9/1972 | Wagner | 411/377 |
| 3,885,492 | 5/1975 | Gutshall | 411/373 |
| 4,041,834 | 8/1977 | Herkes et al. | 411/387 |
| 4,154,138 | 5/1979 | Melone | 411/373 |

FOREIGN PATENT DOCUMENTS 625345  6/1949  United Kingdom ................ 411/377

Primary Examiner—Ramon S. Britts

[57] ABSTRACT

There is disclosed an improved fastener of the type having a head portion, a shank portion extending from the head portion, and a plastic cover overlying the fastener head. The head includes an outer perimeter of generally square configuration having a plurality of substantially straight side portions. The upper surface of the head is provided with an oversized drive recess which extends along the diagonals of the square perimeter. As a result, the fastener head may be readily aligned within a mold which forms the plastic head cover. More particularly, anyone of the straight side portions may engage an alignment surface of the mold to permit the final drive recess forming portion of the mold to be readily aligned with and received by the initial over sized drive recess. The resulting plastic cover entirely overlies the fastener head and the thickness of the plastic within the oversized recess reduces the drive recess dimension to a final desired size.

8 Claims, 9 Drawing Figures

U.S. Patent   Jun. 5, 1984   4,452,556
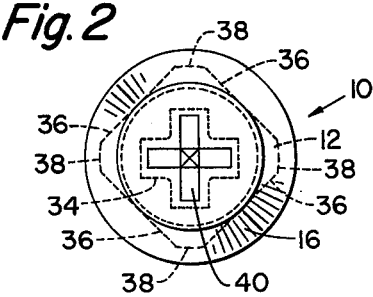
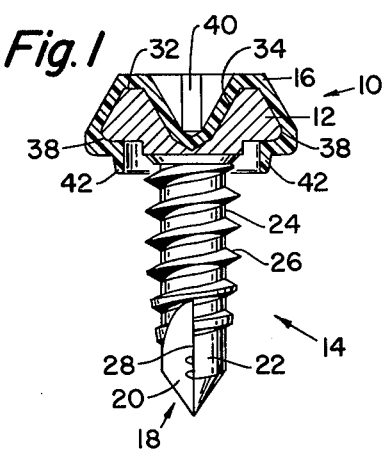
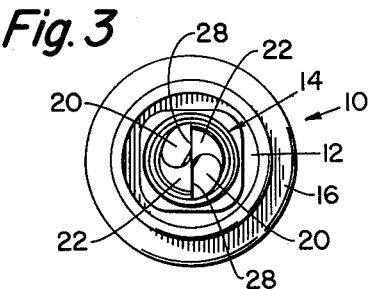
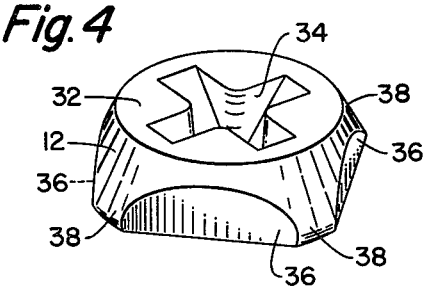
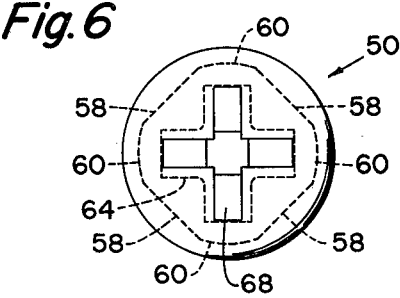
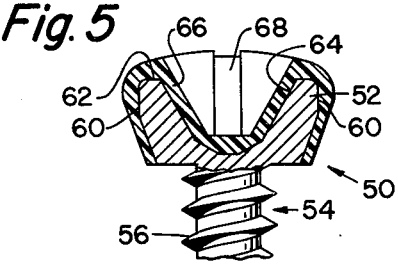
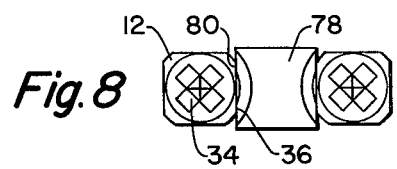
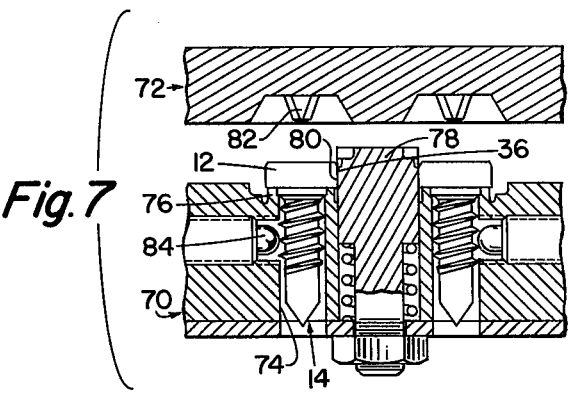
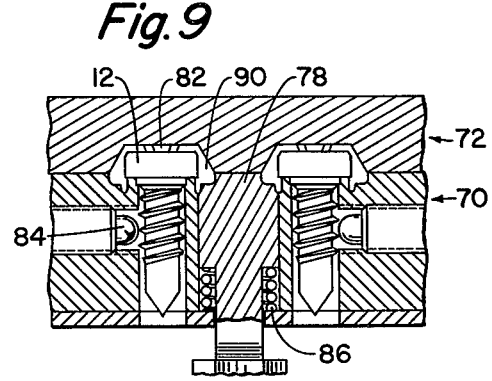

PLASTIC HEADED FASTENER

BACKGROUND OF THE INVENTION

The present invention is generally directed to plastic headed fasteners and more particularly to an improved plastic headed fastener which exhibits higher applied torque before slip characteristics and which may be readily manufactured. The instant invention is further directed to an apparatus and method for manufacturing such an improved plastic headed fastener. An example of a fastener with a plastic cap having a depending skirt for controlling chips is disclosed and claimed in application Ser. No. 81,496, filed on Oct. 12, 1979, which is assigned to the assignee of this invention.

Metallic fasteners having plastic or other non-metallic covers overlying their head portions have found considerable utility. When driven into a work piece, such non-metallic head coverings can form a moisture barrier to prevent rusting or corrosion of the metallic heads.

Such fasteners as currently known in the prior art include a metallic body having a head portion and a shank portion extending therefrom. The shank is usually threaded and the head has an outer substantially circular perimeter. The plastic cover overlies the head and also defines a generally circular outer perimeter. Also, within the upper surface of the metallic head there is formed a oversized drive recess which is effectively reduced in dimension to a final size by the plastic cover.

Unfortunately, because the metallic head defines a circular perimeter, there is only slight interference fit between the head and cover. The cover therefore has a tendency to slip on the head upon the application of even modest driving torque to the drive recess. Obviously, such fasteners are difficult to use where high applied torques are required.

Furthermore, because the final drive recess must be accurately formed in the initial oversized drive recess of the metallic head, the initial oversized recess must be accurately aligned with respect to a complimentary mold projection used in forming the final drive recess. Since the outer perimeter of the metallic head is circular, this accurate alignment is difficult and time consuming to achieve during the manufacture of such fasteners.

It is therefore a general object of the present invention to provide a new and improved fastener of the type having a head portion covered by an overlying layer of non-metallic material.

It is a further object of the present invention to provide such a fastener which includes a head portion configured to prevent slippage of its overlying cover upon the application of applied torque to its drive recess.

It is a further object of the present invention to provide such a fastener which may be more readily manufactured.

More specifically, it is an object of the present invention to provide a metallic fastener blank having a head which includes an outer perimeter having at least one substantially straight side portion to provide increased interference fit between the head and head cover and which may also be utilized for readily aligning the over sized drive recess with a complimentary mold projection which forms the final drive recess within the head cover.

It is also a further object of the present invention to provide an improved apparatus and method for manufacturing such a plastic headed fastener.

SUMMARY OF THE INVENTION

The invention therefore provides a fastener comprising a metallic body including a head portion and a shank portion extending from the head portion. The head portion includes an outer perimeter having at least one substantially straight side portion and an upper surface having a drive recess therein. The fastener further includes a non-metallic cover overlying the head portion.

The present invention further provides a fastener blank for use as an intermediate subassembly in the manufacture of a non-metallic headed fastener. The fastener blank comprises a metallic body incuding a head portion and a shank portion extending from the head portion. The head portion has an outer perimeter defined by at least one substantially straight side and an upper surface having a drive recess therein. The drive recess is greater in dimension than a final desired size and is disposed in a predetermined relation to the outer perimeter straight side to facilitate alignment thereof with a mold for forming a non-metallic molded cover for the head.

The present invention further provides a method of manufacturing a fastener of the type having a metallic body including a head portion and a shank portion with a plastic cover molded over the head. The method includes the steps of forming a fastener blank from metal having a head portion and a shank portion extending from the head portion with the head including an outer perimeter having at least one substantially straight side portion and an upper surface having a drive recess therein being oversized and of greater dimension than a final desired dimension and disposed in a predetermined relation to the perimeter one straight side portion. The method further includes providing a mold having a pair of mold cavities to form the plastic head cover with a first cavity being arranged for receiving the shank portion and having an alignment surface arranged to engage the head perimeter straight side portion and with a second cavity including a final drive recess forming portion arranged with respect to the alignment surface so as to be received within the oversized drive recess when the perimeter straight portion is engaged with the alignment surface and the cavities are brought together. The method further includes the steps of inserting the shank of the fastener blank into the first mold cavity and engaging the head perimeter straight side portion with the alignment surface, bringing the cavities together, and thereafter injecting moldable plastic material in the mold for forming the plastic head cover.

The present invention lastly provides an apparatus for forming a plastic cover over the head of a metallic fastener which includes a shank portion extending from the fastener head and an oversized drive recess within the head. The apparatus includes a first mold having a bore to receive the fastener shank portion and an alignment means including an alignment surface for engaging a substantially side portion of the fastener head. The apparatus further includes a second mold arranged to engage the first mold to form therewith a mold cavity about the fastener head dimensioned in correspondence to the final desired dimension of the plastic cover. The second mold includes a drive recess forming projection aligned with respect to the alignment surface for entering the head recess when the head straight side portion is engaged with the alignment surface. The apparatus further includes holding means for continuously maintaining the fastener in its aligned position within the first mold.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in the several figures of which like reference numerals identify identical elements, and wherein:

FIG. 1 is a side view, partly in cross-section, of a fastener embodying the present invention;

FIG. 2 is a top plan view of the fastener of FIG. 1;

FIG. 3 is a bottom plan view of the fastener of FIG. 1;

FIG. 4 is a perspective view of the head portion of the fastener of FIG. 1 illustrating in detail the configuration of its outer perimeter;

FIG. 5 is a partial side view, partly in cross-section of another fastener embodying the present invention;

FIG. 6 is a top plan view of the fastener of FIG. 5;

FIG. 7 is a partial cross-sectional side view of an apparatus which may be utilized for molding a non-metallic cover over the metallic fastener heads in accordance with the present invention wherein the mold apparatus includes first and second molds illustrated in spaced apart relation and with the metallic fasteners positioned and aligned for the molding operation;

FIG. 8 is a top plan view of a portion of the apparatus of FIG. 7 illustrating the manner in which the fastener heads are aligned within the mold; and FIG. 9 is a partial cross-sectional view similar to FIG. 7 but illustrating the first and second molds in engaged relation for molding non-metallic covers about the metallic fastener heads.

DESCRIPTION OF THE PREFERRED EMBODIMENTS

Referring now to FIGS. 1 through 4, the fastener 10 there shown embodying the present invention is of a type commonly referred to as a drilling screw. However, it will be apparent hereinafter that the present invention may also be advantageously employed in thread tapping or thread forming screws as well as any fastener for that matter which includes an enlarged head and a shank portion extending therefrom. The screw generally includes a metallic body including a head portion 12 and a shank portion 14 extending from the head portion 12. A head cover 16 overlies the head portion 12 and is molded thereto in a manner to be described subsequently. The shank portion 14 of the fastener or screw 10 includes a drill point 18 at the end of the shank 14 opposite the head portion 12. The drill point 18 is fluted and includes a pair of segments 20. The segments 20 are removed from the circular cross-section of the shank leaving land portions 22 remaining. The drill point 18 has an effective transverse width substantially equal to the transverse width of the shank roots 24 and of lesser dimension than the effective transverse dimension of the thread crests 26. The thread of shank portion 14 defined by the roots 24 and crests 26 extends helically from the drill point 18 to the head portion 12.

The drill point 18 terminates in a pair of cutting edges 28 which drill into the work to create an opening in the workpiece. As the screw 10 is driven, the threads defined by the roots 24 and crests 26 form a cooperating thread in the drilled workpiece opening and permit the screw to be driven home.

The head portion 12 includes an upper surface 32. Within the upper surface 32 there is provided a drill receiving recess 34 which is oversized and of greater dimension than a final desired dimension of the resulting drill recess after the cover 16 is molded onto the head portion 12. The head portion 12 further includes an outer perimeter which is generally square in configuration and includes a plurality of substantially straight sides 36 which are joined together by a corresponding plurality of corner segments 38. The initial oversized recess 34 is centered with respect to the longitudinal axis of the head portion 12 and shank portion 14 and extends outwardly therefrom along the diagonals of the square outer perimeter of the head 12.

The cover 16 of the head 12 completely overlies the upper surface 32 of the head portion 12 and is contoured in correspondence with the upper surface of the head 12. As may be noted in FIG. 1, the cover 16 is of generally constant thickness and extends into the oversized recess 34. As a result, the oversized recess 34 is reduced in dimension to form a recess 40 which is of a final desired dimension suitable for interlocking engagement with a driver (not shown).

The cover 16 as may be best noted in FIGS. 2 and 3 defines a substantially circular outer perimeter. Because the head 12 of the metallic body defines an outer perimeter which is generally square, the substantially straight sides 36 of the head 12 will resist the turning of the plastic cover 16 relative to the head 12 to provide a higher torque before slip as rotational torque is applied to the drive recess 40.

As will be further noted in FIG. 1, the plastic cover 16 terminates at its lower extent adjacent the shank 14 in an annular flange 42 which is coaxially disposed with respect to the shank portion 14 and is of greater diameter dimension than the transverse dimension of the shank portion. The features which reside within this flanged structure and its manner of operation are fully disclosed and claimed in application Ser. No. 81,496, filed on Oct. 12, 1979, which is assigned to the assignee of the present invention.

Referring now to FIGS. 5 and 6, another fastener embodying the present invention is there shown. The fastener 50 like the fastener 10 of FIGS. 1 through 4, also includes a head portion 52 and a shank portion 54. The shank portion includes a helical thread 56 and extends from the head portion 52. The head portion 52 also defines an outer perimeter which is generally square including substantially straight side portions 58. The side portions 58 are joined by a corresponding plurality of corner sections 60. The head portion 52 further includes an upper surface 62. Within the upper surface 62 there is formed an oversized drive recess 64. The drive recess 64 is again centered with respect to the longitudinal axis of the head 52 and shank 54 and extends outwardly therefrom along the diagonals of the square outer perimeter of the head 52.

Overlying the head 52 there is provided a cover 66 which may be formed from non-metallic material such as plastic. During the formation of the plastic cover 66, the oversized drive recess 64 is reduced in dimension to form a final drive recess 68 which is of a desired final dimension suitable for interlocking engagement with a driver (not shown).

It will be noted from FIGS. 2 and 6 that when the plastic covers 16 and 66 are formed over their respective heads 12 and 52, the final drive recesses 40 and 68 are accurately aligned with the initial oversized drive recesses 34 and 64. Hence, when the covers 16 and 66 are applied to the heads 12 and 52, the final drive recess forming portion of a suitable mold must be accurately aligned with the head portions and accurately received therein for forming the final drive recesses.

FIGS. 7 through 9 illustrate an apparatus which provides such accurate alignment in an efficient manner suitable for high volume manufacture of the plastic headed fasteners described above. Referring specifically to FIG. 7, the apparatus there shown embodying the present invention comprises a mold which includes a first mold 70 and a second mold 72. The first mold 70 has a bore 74 dimensioned for receiving the shank 14 of a fastener metallic body or fastener blank. The head 12 of the fastener blank is supported upon an annular rim 76. For properly aligning the head 12 with the other mold 72, the first mold 70 includes an alignment means 78 having an alignment surface 80 which is arranged to engage one of the substantially straight sides 36 of the head 12. The second mold 72 includes a projection 82 which is complimentary in configuration to the drive recess within the head 12 but of smaller dimension to permit the forming of the final drive recess. The projection 82 is aligned with respect to the alignment surface 80 so that when the substantially straight side portion 36 is in surface engagement with the alignment surface 80, the oversized drive recess and the projection 82 will be in accurate alignment. Further, because the oversized drive recess is concentric with all of the diagonals of the square outer perimeter of the head 12, this accurate alignment will be achieved if any one of the four substantially straight side portions is in engagement with the alignment surface 80. In this manner, the oversized drive recess of the head 12 may be accurately positioned within the mold 70 with little effort and with maximum efficiency.

For maintaining the shank 14 in its properly orientated position, the mold 70 includes a spring detent 84 which acts upon the shank 14 to resist rotational or axial movement of the metallic screw blank during the molding operation. It will also be noted in FIG. 7 that the structure of the molds 70 and 72 is duplicated on opposite sides of the alignment means 78 to permit two fastener blanks to be operated upon in a single molding operation. Of course, two additional molding stations may be provided normal to those illustrated so that a total of four may be operated on at one time. Also, as will be appreciated from the foregoing, the head portion 12 need have only one substantially straight side portion in order to effect accurate alignment. However, with four such substantially straight side portions, accurate alignment is assured regardless of the manner in which the shank 14 is placed within the bore 74.

Referring now to FIG. 9, it illustrates the molds 70 and 72 after they have been brought together. It will be noted that the alignment means 78 is spring loaded by a spring 86 and is forced axially downwardly by the second mold 72. Even though the alignment means 78 is moved away from the head portion 12 of the fastener blank, the spring loaded detent 84 will maintain the head portion 12 in accurate alignment to the projection 82 thereafter.

As will also be noted in FIG. 9, the molds 70 and 72 define a mold cavity 90 about the head 12 which is dimensioned in correspondence to the final desired dimension of the plastic cover. With the molds 70 and 72 in their positions as shown in FIG. 9 the plastic covers may be formed over the heads 12 by injecting moldable plastic material into the mold cavity 90 in a manner well known in the art.

After the molding operation is completed, the molds 70 and 72 are once again separted and the finished fasteners are ejected from the molds. Also, the spring 86 will return the alignment means 78 to its initial position as illustrated in FIG. 7.

From the foregoing, it may be appreciated that the present invention provides a new and improved plastic headed fastener. Because the fastener of the present invention includes a head portion defining a generally square outer perimeter, the interference fit between the head portion 12 and the cover 16 is enhanced to provide a higher torque before slip between the cover and head upon the application of torque to the drive recess. Additionally, because the oversized initial drive recesses are concentric with the diagonals of the square outer perimeter of the heads, the accurate alignment of the oversized drive recesses with the molding projections 82 is readily achieved by the simple engagement of one of the substantially straight sides of the head with the alignment surface of the mold. Furthermore, as will be further appreciated from the foregoing, by providing the generally square perimeters on the head 12, the fastener blanks can easily be orientated to prevent interference in the molds which would otherwise cause breakage. Lastly, the spring detent allow the heads 12 to be maintained in proper alignment with respect to the mold projections 82 as the molds are brought together to assure that an accurately formed plastic cover over the heads will result.

While particular embodiments of the present invention have been shown and described, modifications may be made, and it is therefore intended to cover in the appended claims all such changes and modifications which fall within the true spirit and scope of the invention.

I claim:

1. A fastener comprising: a metallic body including a head portion and a shank portion extending from said head portion, said head portion including an outer perimeter having a plurality of substantially straight side portions and an upper surface including a drive recess therein of a predetermined configuration, said recess being symmetrical with and disposed in a predetermined orientation with respect to each of said side portions; and non-metallic cover means substantially enclosing said head portion wherein said cover means generally is conformed to the configuration of said drive recess providing a generally constant thickness of nonmetallic material within said drive recess, whereby said straight side portions of said fastener facilitate proper orientation of said body in a mold preventing damage thereto and thereby insuring formation of generally constant thickness of said non-metallic material within said recess and whereby an interference fit between said cover means and said outer perimeter of said head portion provides for greater torque transmission from said cover means to said head portion.

2. A fastener as defined in claim 1 wherein said recess is oversized and wherein said cover means reduces the size thereof to a final desired size.

3. A fastener as defined in claim 1 wherein said head portion outer perimeter is substantially square in configuration and wherein said recess extends outwardly from the longitudinal axis of said head and shank portions along the diagonals of said perimeter.

4. A fastener as defined in claim 1 wherein said cover means comprises moldable plastic material.

5. A fastener as defined in claim 1 wherein said cover means defines a generally circular outer perimeter.

6. A fastener as defined in claim 2 wherein said head portion outer perimeter is substantially square in configuration and wherein said recess extends outwardly from the longitudinal axis of said head and shank portions along the diagonals of said perimeter.

7. A fastener as defined in claim 6 wherein said cover means comprises moldable plastic material.

8. A fastener as defined in claim 7 wherein said cover means defines a generally circular outer perimeter.

* * * * *

UNITED STATES PATENT AND TRADEMARK OFFICE
CERTIFICATE OF CORRECTION

PATENT NO. : 4,452,556

DATED : June 5, 1984

INVENTOR(S) : John F. Nelson, et al.

It is certified that error appears in the above-identified patent and that said Letters Patent is hereby corrected as shown below:

On the title page Insert:

-- (73) Assignee: Illinois Tool Works Inc., Chicago, Ill. --.

-- Attorney, Agent or Firm: J.R. Halvorsen; T.W. Buckman --.

Signed and Sealed this

Twelfth Day of February 1985

[SEAL]

Attest:

DONALD J. QUIGG

*Attesting Officer* — *Acting Commissioner of Patents and Trademarks*